United States Patent
Kaneko et al.

[11] Patent Number: 5,704,206
[45] Date of Patent: Jan. 6, 1998

[54] COAL BURNER COMBINED POWER PLANT HAVING A FUEL REFORMER LOCATED WITHIN THE COAL FURNACE

[75] Inventors: Shozo Kaneko; Satoshi Uchida; Yasuhiro Yamauchi, all of Tokyo; Susumu Sato, Nagasaki; Yoshiyuki Wakabayashi, Nagasaki; Yoshinori Kobayashi, Nagasaki; Yoshinori Hyakutake, Nagasaki, all of Japan

[73] Assignee: Mitsubishi Jukogyo Kabushiki Kaisha, Tokyo, Japan

[21] Appl. No.: 447,935

[22] Filed: May 23, 1995

[30] Foreign Application Priority Data

May 24, 1994 [JP] Japan ................... 6-109600

[51] Int. Cl.$^6$ ........................................ F02B 33/00
[52] U.S. Cl. .............. 60/39.12; 60/39.463; 60/39.182; 60/736
[58] Field of Search ............ 60/39.12, 39.182, 60/39.463, 39.464, 736; 110/263; 122/7 R, 7 B

[56] References Cited

U.S. PATENT DOCUMENTS

| | | | |
|---|---|---|---|
| 1,840,690 | 1/1932 | Bissell | 60/736 |
| 3,194,015 | 7/1965 | Pacault | 60/39.182 |
| 3,353,360 | 11/1967 | Gorzegno | 60/39.182 |
| 3,791,137 | 2/1974 | Jubb et al. | 60/39.463 |
| 3,895,488 | 7/1975 | Koch | 60/736 |
| 4,253,300 | 3/1981 | Willyoung | 60/39.464 |
| 4,315,893 | 2/1982 | McCallister | 422/109 |
| 4,442,665 | 4/1984 | Fick et al. | 60/39.182 |
| 4,476,674 | 10/1984 | Berman | 60/39.182 |
| 4,546,603 | 10/1985 | Arakawa et al. | 60/39.12 |
| 4,852,996 | 8/1989 | Knop et al. | 60/39.12 |
| 5,069,685 | 12/1991 | Bissett et al. | 60/39.12 |
| 5,133,180 | 7/1992 | Horner | 60/39.12 |
| 5,229,102 | 7/1993 | Minet et al. | 423/652 |
| 5,309,707 | 5/1994 | Provol et al. | |
| 5,357,746 | 10/1994 | Myers et al. | 60/736 |
| 5,490,377 | 2/1996 | Janes | 60/39.12 |

FOREIGN PATENT DOCUMENTS

| | | |
|---|---|---|
| 0 351 094 | 1/1990 | European Pat. Off. |
| 61-192816 | 8/1986 | Japan |
| 63-57825 | 3/1988 | Japan |
| 63-105241 | 5/1988 | Japan |
| 4-246244 | 9/1992 | Japan |

OTHER PUBLICATIONS

Thelen, "Gas-/Dampfturbinenprozesse für feste Brennstoffe mit Druckwirbelschichtfeuerung", VGB Kraftwerkstechnik, vol. 73, No. 8, 1993, pp. 671–677.

Primary Examiner—Charles G. Freay
Assistant Examiner—Ted Kim
Attorney, Agent, or Firm—Wenderoth, Lind & Ponack

[57] ABSTRACT

A coal burner combined power plant includes a gas turbine for burning coal in a furnace under the pressure and uses produced gas. A steam turbine is combined with an exhaust gas boiler using exhaust gas from the gas turbine. Another fuel is burned at an inlet of the gas turbine for allowing the temperature at the inlet of the gas turbine to rise. A fuel reformer reforms the other fuel and is located within the furnace.

8 Claims, 12 Drawing Sheets

*FIG. 14*
*(PRIOR ART)*

COAL BURNER COMBINED POWER PLANT HAVING A FUEL REFORMER LOCATED WITHIN THE COAL FURNACE

BACKGROUND OF THE INVENTION

1. Field of the Invention

The present invention relates to an improvement in the efficiency of a coal burner combined power plant for utilities and industries.

2. Description of the Related Art

Three examples of conventional coal burner combined power plants will be described hereunder.

(First Example)

Figure 12:
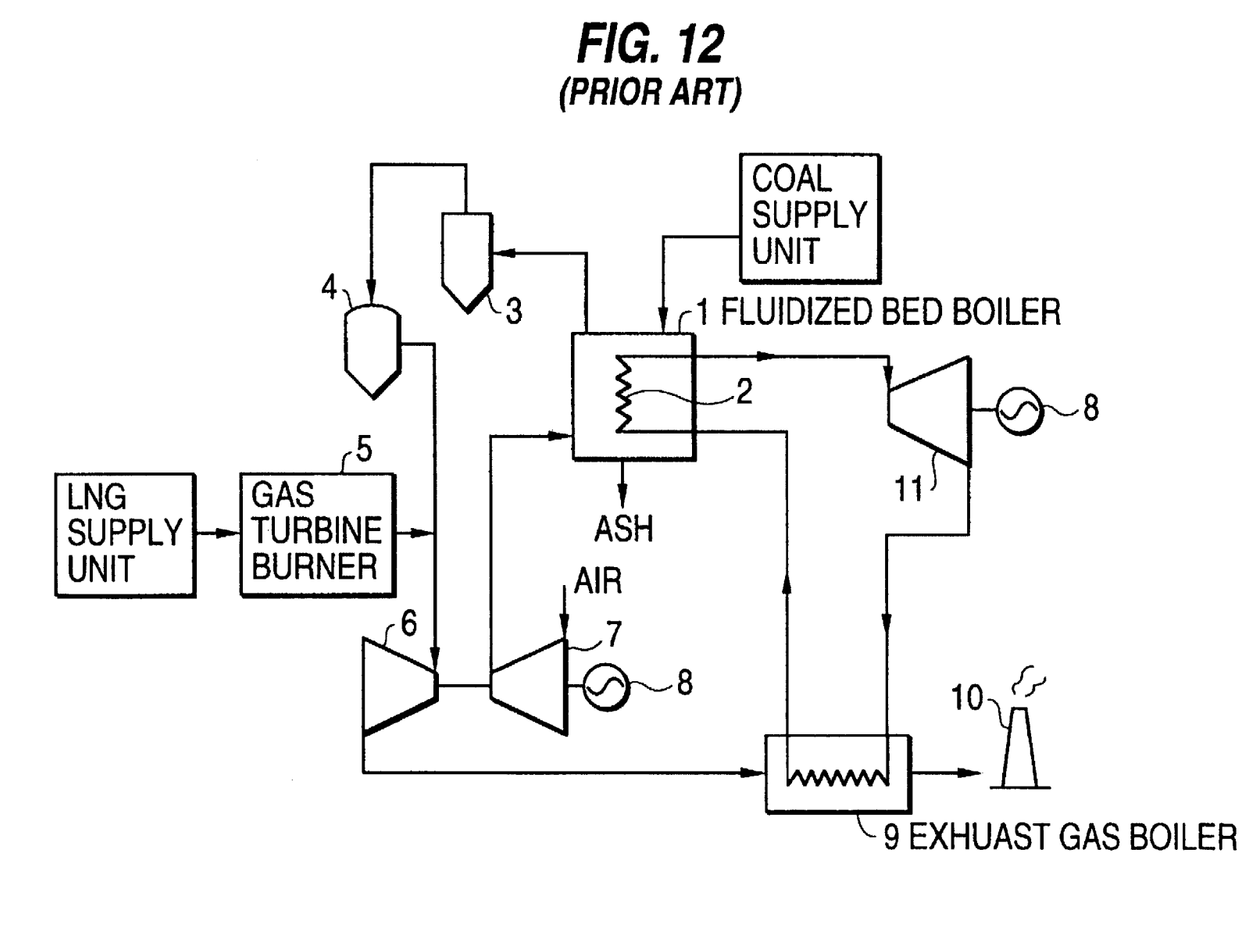
FIG. 12 is a systematic structural diagram showing a conventional power plant where coal is burned under a pressure fluidized bed.

FIG. 12 is a diagram showing a systematic structure of a first example.

Coal serving as fuel is supplied to a pressure fluidized bed boiler 1 and then burned in the pressure fluidized bed boiler 1 by air which has been pressurized (about 10 to 30 kg/cm$^2$) by an air compressor 7 coupled to a gas turbine 6. The high-temperature combustion gas (about 850° C.) is allowed to pass through a cyclone 3 and ceramic filter 4, which sere as a dust removing unit.

Since the combustion gas has relatively low temperature for a temperature at a gas turbine inlet, natural gas is used as a topping gas so as to be mixed with gas which has been burned by a burner 5. As a result, the temperature at the gas turbine inlet rises so that the efficiency of the plant is further enhanced. The gas turbine 6 drives the air compressor 7, and produces power at a power generator 8.

The heat generated at the pressure fluidized bed boiler 1 is absorbed by a steam heat transfer tube 2. The steam system is heated by an exhaust gas boiler 9 using exhaust gas from the gas turbine, and compound power generation cycle of the power generator 8 is constituted by a steam turbine 11 drive by the generated steam. The exhaust gas from the exhaust gas boiler 9 is discharged from a chimney 10.

(Second Example)

Figure 13:
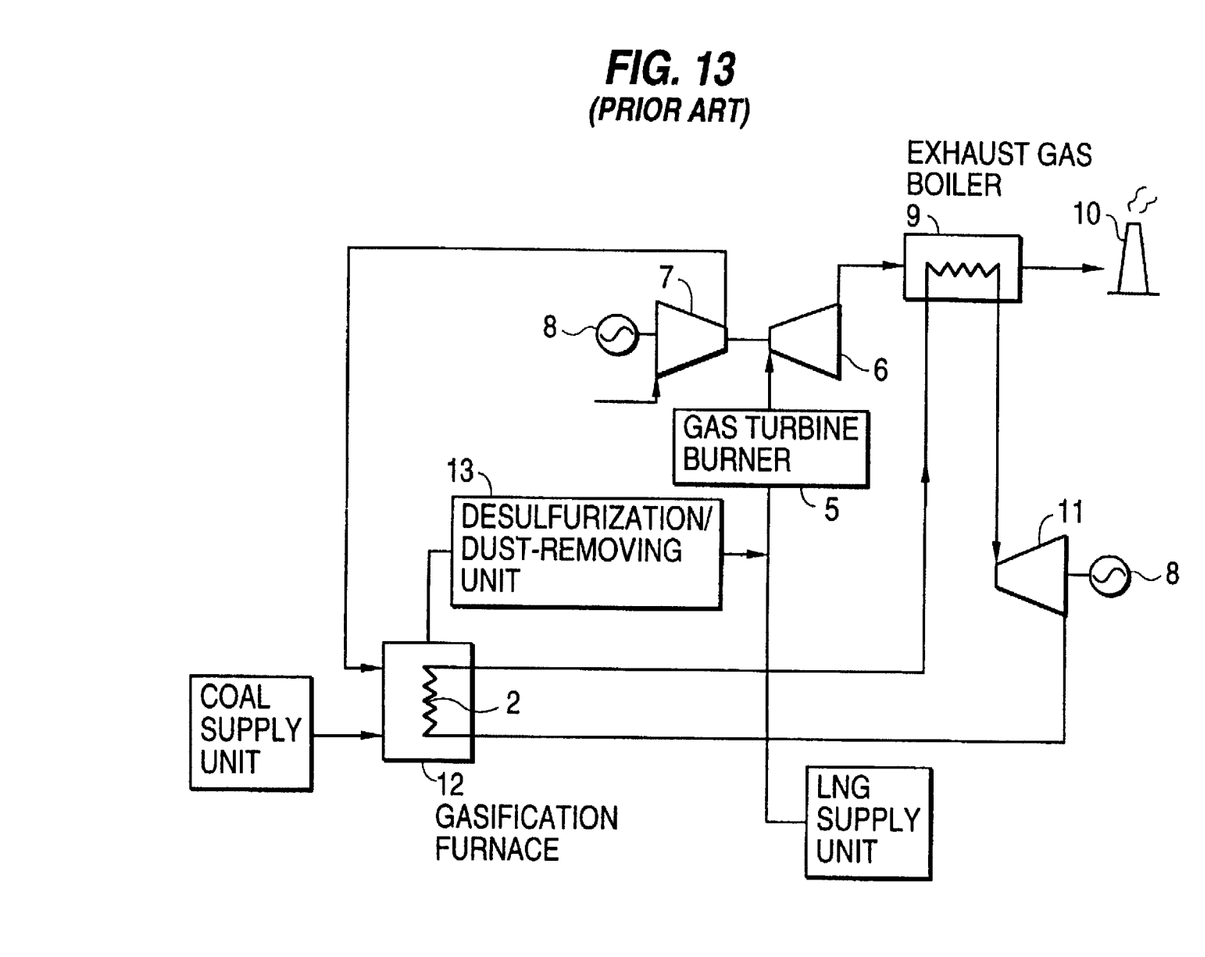
FIG. 13 is a systematic structural diagram showing another conventional power plant for gasifying coal.

FIG. 13 is a diagram showing a systematic structure of a second embodiment.

Coal serving as fuel is partially burned into a gasified coal gas rich in carbon monoxide and hydrogen in a coal gasification furnace 12, and then heat-exchanged in the heat transfer tube 2 with the steam system. Thereafter, the coal gas is allowed to pass through a desulfurization/denitration unit 13 before being introduced to the gas turbine burner 5. For the purposes of compensating a heating value of gas produced in the coal gasification furnace 12 and of stabilizing the ignition of the gas turbine burner 5, natural gas as a stabilizing fuel, necessary for bringing a flexibility of fuel to the power plant, is mixed with the gasified coal gas immediately before the gas turbine burner 5.

The high-temperature gas which is burned in the gas turbine burner 5 allows the gas turbine 6 to driven so that the air compressor 7 is driven and to generate power at the power generator 8. Further, downstream of the gas turbine 6, the exhaust gas boiler 9 exchanges heat with the steam system, and steam produced by heat supply due to the heat transfer section 2 within the coal gasification furnace allows the steam turbine 11 to be driven, thereby generating power at the power generator 8. The exhaust gas from the exhaust gas boiler 9 is discharged from the chimney 10.

(Third Example)

Figure 14:
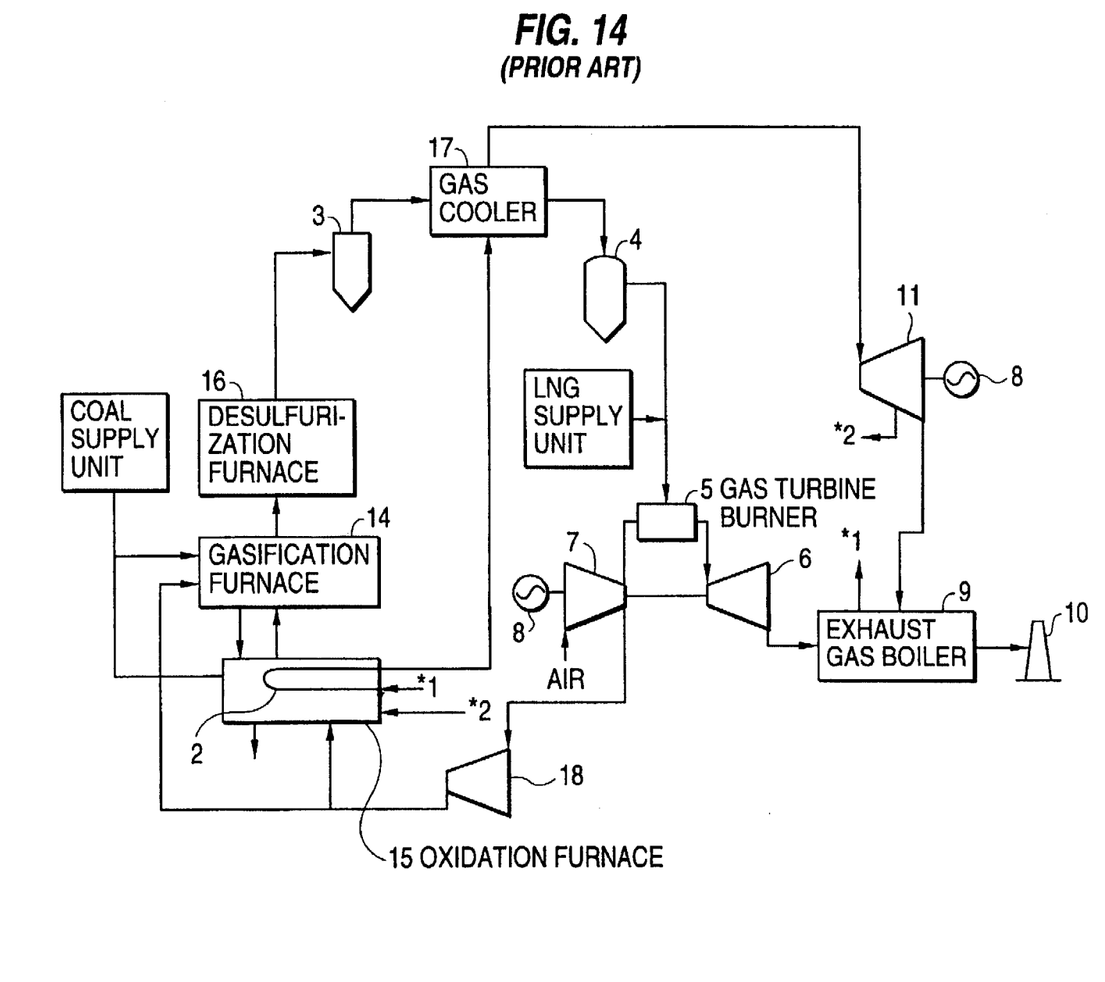
FIG. 14 is a systematic structural diagram showing a topping power generation cycle where coal portion gasification and a fluidized bed combustion are combined.

FIG. 14 is a diagram showing a systematic structure of a third example.

Coal serving as fuel is thrown in a coal portion gasification furnace 14, and combustion/gasification is partially conducted in accordance with the inverse ratio of coal. Unburnt char is thrown in a full-quantity oxidation furnace 15. The full-quantity oxidation furnace 15. The full-quantity oxidation furnace 15 completely burns the unburnt char as a main fuel. The heat produced by the oxidation furnace 15 is absorbed by the steam system through the heat transfer section 2 disposed within the fluidized bed.

After the gas produced from the oxidation furnace 15 is introduced into the coal portion gasification furnace 14, that gas is introduced together with gasified coal gas into the desulfurization furnace 16 where the gas is subjected to desulfurization in a reducing atmosphere using lime stone. Subsequently, after desulfurized fuel gas has passed the cyclone 3, it exchanges heat with the steam system at a gas cooler 17. Thereafter, the gas is again dust-removed through the ceramic filter 4 before being introduced into the gas turbine burner 5.

Gas at the inlet of the gas turbine burner 5 is a low calorie gas, and provides excellent combustion as well as diversity and flexibility of fuel for the power plant. For this reason, natural gas is used as auxiliary/compound fuel immediately before the gas turbine burner 5. As a result, the gas turbine 5 enables excellent combustion. After gas has been turned by the gas turbine burner 5, the gas turbine 6 allows the air compressor 7 to be driven, and the power generator 8 generates power.

A part of the air compressed by the air compressor 7 is again boosted by an air booster 18 before being introduced into the gas portion gasification furnace 14 and the oxidation furnace 15. Because exhaust gas from the gas turbine has a high temperature such as about 560° C., the heat of the exhaust gas is collected by the steam system through the exhaust gas boiler 9. The steam system obtains heat values from the heat transfer tube 2 within the oxidation furnace 15, the gas cooler 17 and the exhaust gas boiler 9, and constitutes the compound power generation cycle of the power generator 8 coupled to the steam turbine 11.

The conventional power plants suffer from no significant problems. However, from the viewpoints of effective utilization of energy resources and environmental countermeasures, as well as improvement in the profitability of the power plant, the present plant efficiency (42 to 49%) needs to be further improved.

SUMMARY OF THE INVENTION

An object of the present invention is to provide a coal burner combined power plant which is improved in the efficiency of the plant by providing a reformer for gas turbine fuel therein.

In order to solve the foregoing problem, there is provided a coal burner combined power plant which includes a gas turbine using gas produced by burning coal in a furnace under pressure, and a steam turbine combined with an exhaust gas boiler using exhaust gas from the gas turbine. Another fuel is burned at an inlet of the gas turbine to allow the temperature at the inlet of the gas turbine to rise, wherein a fuel reformer for reforming the other fuel is located within the furnace.

According to the present invention, a furnace for burning coal under pressure may be a pressure fluidized bed boiler. In this case, the fuel reformer may be disposed within the pressure fluidized bed boiler. The location of the reformer is selected in accordance with the fuel to be reformed.

Also according to the present invention, a furnace for burning coal under pressure may be a coal gasification furnace for partially burning a coal. In this case, the fuel reformer may be disposed within the coal gasification furnace.

In these structures, fuel which has been reformed by the fuel reformer is burned by the gas turbine burner disposed at the inlet of the gas turbine.

Still further according to the present invention, a furnace for burning coal under pressure may be a coal gasification furnace having an oxidation furnace for completely burning unburnt char. In this case, the fuel reformer may be located within the oxidation furnace. In this structure, reformed fuel may be introduced into the coal gasification furnace or into the gas turbine burner.

Yet still further according to the present invention, a furnace for burning coal under pressure may be a coal gasification furnace having a desulfurization furnace and a gas cooler. In this case, the fuel reformer may be located inside of any one of the desulfurization furnace and the gas cooler. In this case, the reformed gas is burned by the gas turbine burner.

According to the present invention, fuel to be reformed by the fuel reformer may be natural gas, methanol or the like.

In the coal burner combined power plant in accordance with the present invention, since the fuel reformer is located as described above, heat energy which has been collected by the steam system in the conventional power plant is changed into chemical energy by reforming the fuel in the fuel reformer. After the reforming, the fuel gas is directly burned to provide actuating fluid, and power is generated by the age turbine using the actuating fluid.

Also according to the present invention, since fuel reformation makes the heat value of the fuel rise, fuel consumption can be reduced. For example, in the case where natural gas is reformed under the condition where a reformation temperature is 800° C., a reformation pressure is 30 atm, and the mole ratio (hereinafter referred to as "S/C") of steam S to carbon within natural gas is 2.5, a higher heating value rises about 1.167 times.

A reaction formula for steam reformation of natural gas is stated below.

CnHm+nH$^2$→nCO+(m/2+n)H$^2$−Q (endoerigic)

Methane mainly occupying natural gas is:

$CH_4+H_2O \rightarrow CO+3H_2-49.3$ (kcal/mol)

Figure 9:
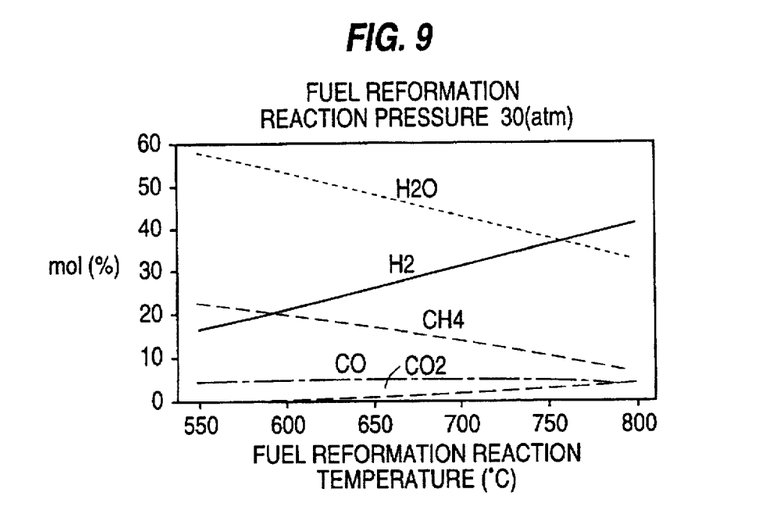
FIG. 9 is a graph representing a mole ratio of gas composition after fuel reformation due to the fuel reformer in the power plant of the present invention.
Figure 10:
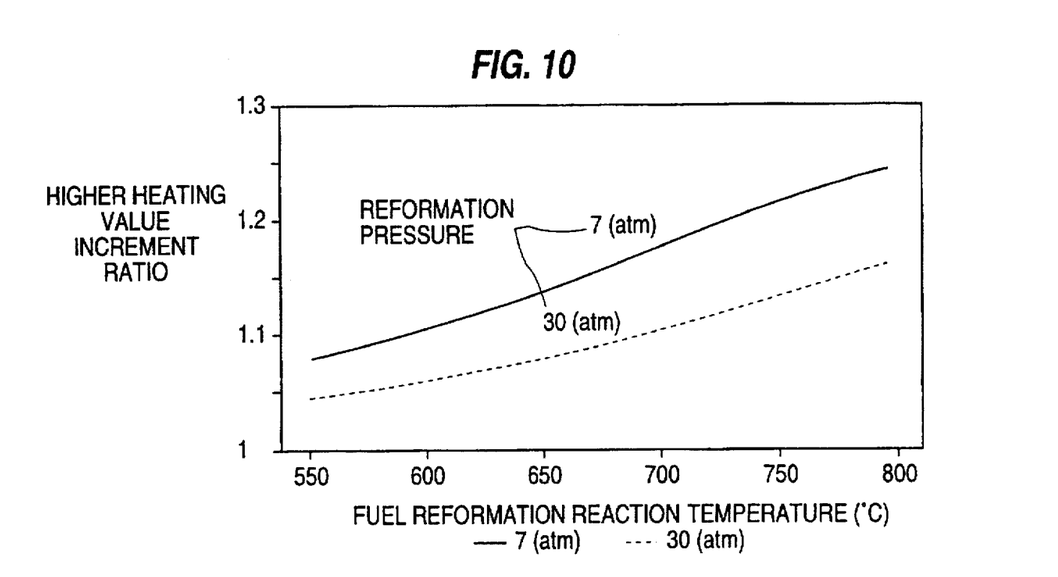
FIG. 10 is graph representing an increment ratio of a higher heating value after fuel reformation due to the fuel reformer in the power plant of the present invention.

The ideal heating value before and after reforming increases from CH$_4$=212.8 (kcal/mol) to CO (67.7 kcal/mol) +3H$_2$ (3×68.3 kcal/mol)=272.6 (kcal/mol), that is 1.28 times. However, in fact, the gas composition after reforming is different depending on the reforming conditions (temperature, pressure, S/C) as shown in FIG. 9, and the increase rate of the higher heating value becomes slightly low, as shown in FIG. 10.

In the steam used in reforming, for the purpose of preventing the precipitation of carbon within the catalyst (nickel catalyst with a carrier of alumina), S/C of 2.5 ore more is required. However, because the throw-in of a large amount of steam leads to an increase of moisture loss, the range of S/C=2 to 4 is selected.

Subsequently, a description will be given of a case where methanol is fuel-reformed. In this case, a chemical reaction formula is stated below.

$CH_3OH_2 \rightarrow CO+2H_2-21.7$ (kcal/mol)

$CO+H_2 \rightarrow CO_2+H_2-9.83$ (kcal/mol)

A copper based catalyst is used as a reformation catalyst, and reformation is conducted under the conditions where the temperature is about 200° to 200° C., and the pressure is 10 kg/cm$^2$ or less, that is, a low pressure. Also, for the purpose of preventing the precipitation of carbon within catalyst, S/C is set to about 2 to 3 for conducting reaction.

Figure 11:
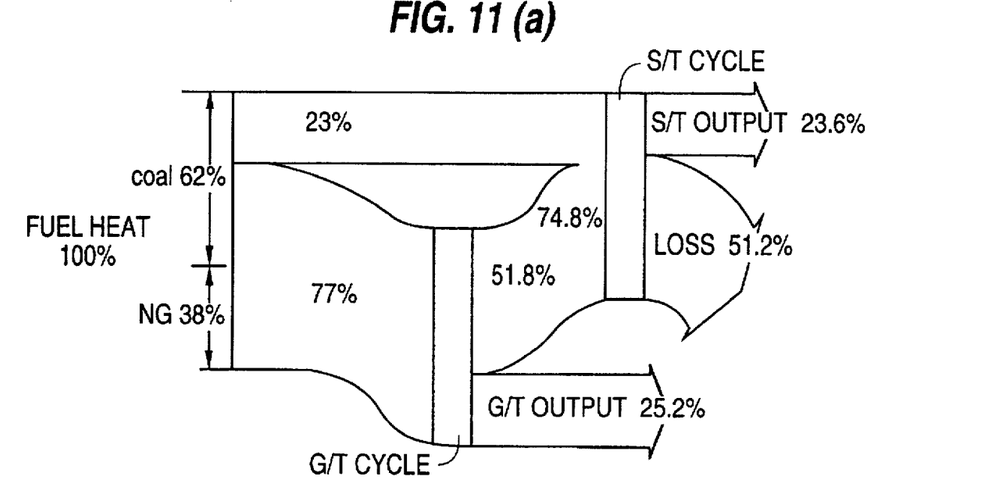
FIGS. 11(a) and 11(b) are diagrams showing a change of an energy flow due to fuel reformation in the power plant of the present invention.

Next, an operation where the fuel reformation is provided in a compound cycle will be described. As shown in FIGS. 11(a) and 11(b), a part of the heat energy which has been thrown in a steam Rankine cycle within the cycle in the prior art, is converted into chemical energy by using a fuel reforming action. The chemical energy is moved to the compound cycle (of the Brayton cycle + the Rankine cycle) as shown in FIG. 11(b) so that it can be directly burned into gas turbine operating fluid. As a result, the quantity of entropy production is reduced, thereby improving the efficiency of a plant.

Further, the present invention, since the fuel reformer is disposed within a furnace containing a high-temperature combustion gas therein, methanol, which allows a temperature necessary for reforming to be 300° C., as well as natural gas of the like, which requires reformation at a high temperature (about 550° to 850° C.), can be used as fuel.

The fact is well known that the efficiency of a power plant is more improved as a difference in temperature between the heat supply side (a high-temperature side) and the heat receiving side (a low-temperature side) is made small. In the present invention, after the temperature of the high-temperature combustion gas is lowered once by using the high-temperature heat of combustion gas for reformation of fuel, combustion gas is assembled into the power generation cycle. As a result, not only the efficiency of power generation is improved for that reason, but also the efficiency is improved by reforming fuel. Hence, the efficiency of a power plant is remarkably improved.

DETAILED DESCRIPTION OF THE PREFERRED EMBODIMENTS

Hereinafter, a description will be given in detail of a coal burner combined power plant in accordance with the embodiments of the present invention with the reference to the accompanying drawings.

In the embodiments as will be described below, the parts identical to those of conventional power plants shown in FIGS. 12 to 14 are designated by the same symbols, and their description is omitted because of duplication.

(First Embodiment)

Figure 1:
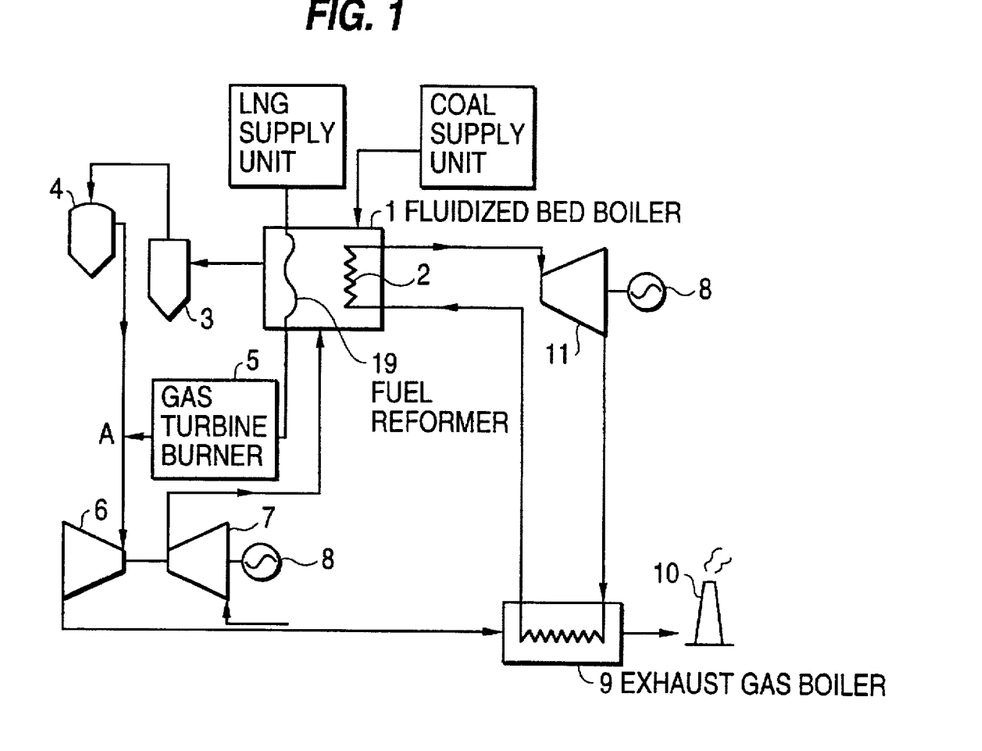
FIG. 1 is a structural diagram showing a power generating system in accordance with a first embodiment of the present invention.

FIG. 1 shows a first embodiment of the present invention.

In this embodiment, a fuel reformer 19 is disposed within a pressure fluidized bed boiler 1 in the conventional plant shown in FIG. 12. In other words, a steam heat transfer tube 2 as well as a fuel reformer 19 are disposed within the fluidized bed in a furnace where the fluidized bed is burned under pressure. After natural gas is reformed under the conditions where a reformation temperature is 800° C., a reformation pressure is 30 atm and S/C is 2.5, so as to be converted into gas having a higher heating value. The gas is burned by a gas turbine burner 5 before having mixed with combustion gas which has been produced at point A due to fluidized bed combustion.

Figure 7:
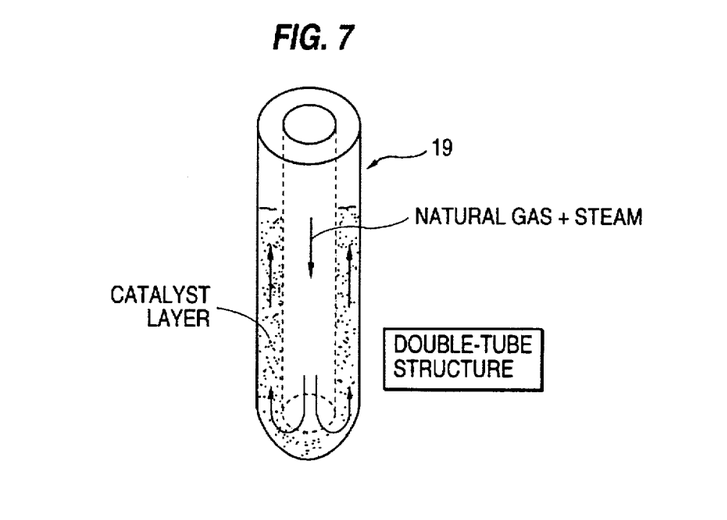
FIG. 7 is a perspective view showing one example of the structure of a fuel reformer used in the power plant of the present invention.
Figure 8:
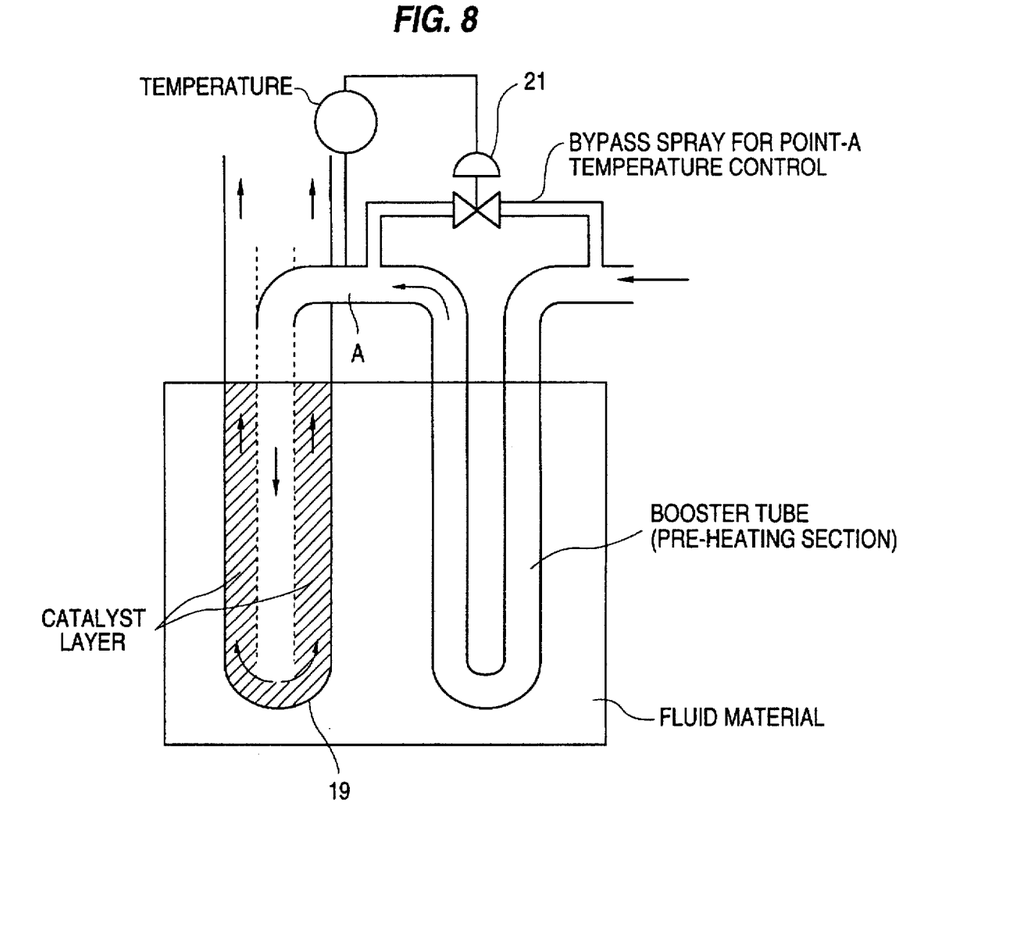
FIG. 8 is an explanatory diagram showing a temperature control method in the fuel reformer used in the power plant of the present invention.

FIG. 7 shows one example of the structure of the fuel reformer 19. The fuel reformer is of a double-tube structure. After gas is made to flow in an inner cylinder thereof and preheated, the gas is reformed by a catalyst which is filled in an outer cylinder thereof. Because the inlet temperature of the catalyst layer must be about 450° to 500° C. (depending upon the catalyst characteristics), temperature control using a bypass spray which is controlled by a temperature control bypass valve 21 as shown in FIG. 8 is required.

The temperature of gas produced from the fluidized bed combustion is relatively low, that is, about 850° C. However, after being dust-removed through a cyclone 3 and a ceramic filter 4, that gas is mixed with the high-temperature gas which has been burned in the burner 5 into a high-temperature gas of 1,300° C. or higher. The high-temperature gas introduced into a gas turbine 6 and drives a compressor 7 and generates power at a power generator 8. The efficiency of the gas turbine is remarkably improved by making the inlet temperature of the gas turbine higher. By making the inlet temperature of the gas turbine higher, the temperature of the exhaust gas from the gas turbine rises similarly, and the quantity of heat collected at the exhaust gas boiler 9 is also increased. The exhaust gas from the exhaust gas boiler 9 is discharged from a chimney 10.

A steam system receives heat supplied from the exhaust gas boiler 9 as well as heat transfer tube 2 disposed within a layer of the fluidized bed combustion under pressure. The steam system then allows the steam turbine 11 to generate power at the power generator 8. With this system, the efficiency of the plant is improved by about 4% as a relative value.

In the power plant in accordance with this embodiment, because the fuel reformer 19 is disposed within the fluidized layer of the pressure fluidized bed boiler 1, in the heat transfer within the fluidized layer, the heat transfer coefficient is largely high (3 to 5 times as high as convective heat transfer). Therefore, a difference between the temperature of the fluidized layer and the temperature of the surface of the heat transfer tube can be remarkably reduce, compared with a case of the heat transfer due to fire radiation or gas convection at a fire furnace or a gas turbine combustion chamber.

Further, because the temperature and the heat transfer coefficient are uniform with the fluidized layer, damage of the heat transfer tube due to the local temperature rising is difficult to cause. Therefore, there is an advantage in that the gas within the heat transfer tube can be heated to high-temperature.

(Second Embodiment)

Figure 2:
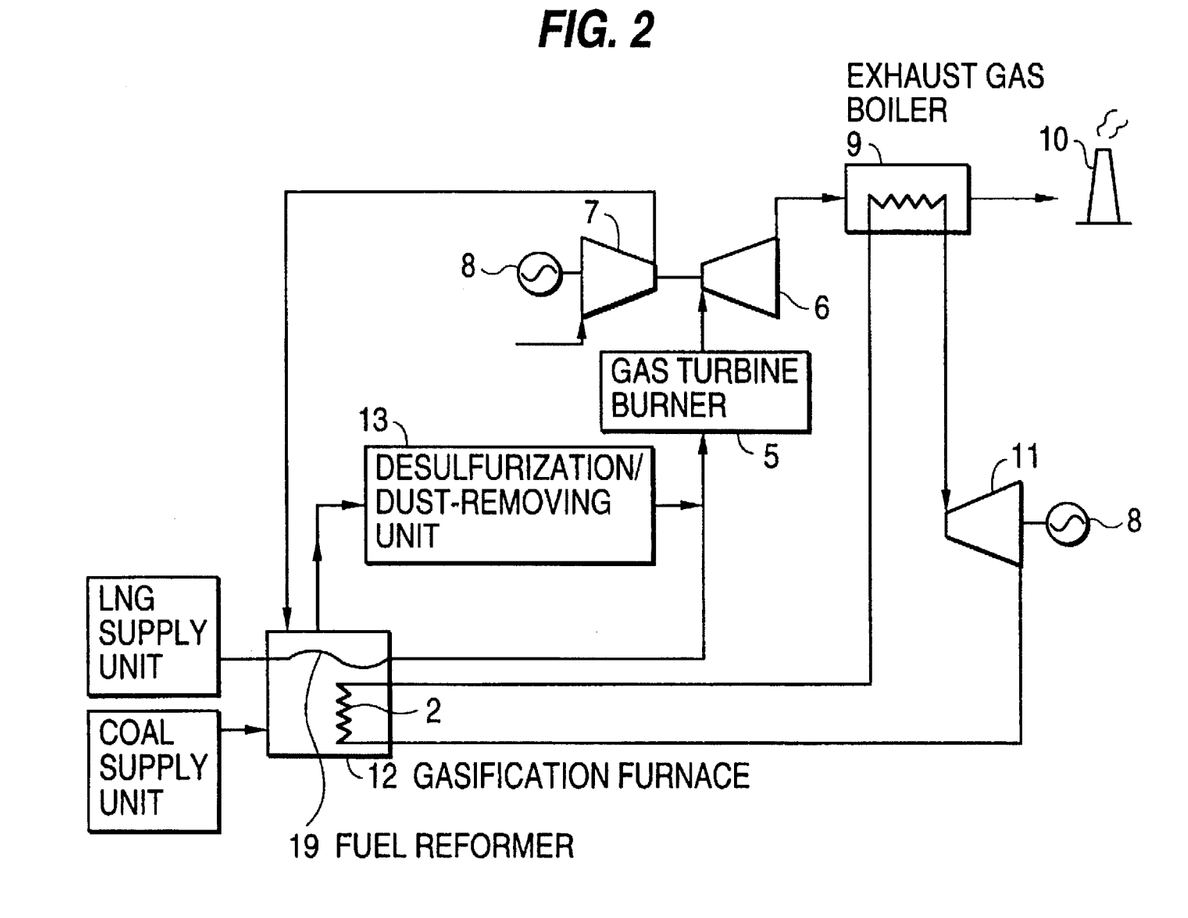
FIG. 2 is a structural diagram showing a power generating system in accordance with a second embodiment of the present invention.

FIG. 2 shows a second embodiment of the present invention.

In this embodiment, a fuel reformer 19 is disposed within the coal gasification furnace 12 in the conventional plant shown in FIG. 13.

In FIG. 2, using gasified coal gas from the gasification furnace 12 which partially burns coal, the fuel reformer 19 is disposed in a part of the coal gasification furnace 12, where a steam system heat transfer tube 2 has been disposed in the conventional plant. With this structure, natural gas is reformed under the reformation condition where the reformation temperature is 800° C., the reformation pressure is 30 atm and S/C is 2.5. The gas is then mixed with gasified coal gas which has passed through a desulfurization/dust-removing unit 13 before being burned by the burner 5 immediately before the gas turbine 6. Subsequently, that gas allows the gas turbine 6 to drive the compressor 7, and to generate power at the power generator 8.

Because the exhaust gas from the gas turbine has a high temperature, it is combined with a heat collecting boiler 9 to constitute a compound cycle, which makes the steam turbine 11 generate power at the power generator 8. The exhaust gas at the outlet of the heat collecting boiler 9 is discharged through the chimney 10. As a result, the efficiency of a plant is improved 4% as relative value.

(Third Embodiment)

Figure 3:
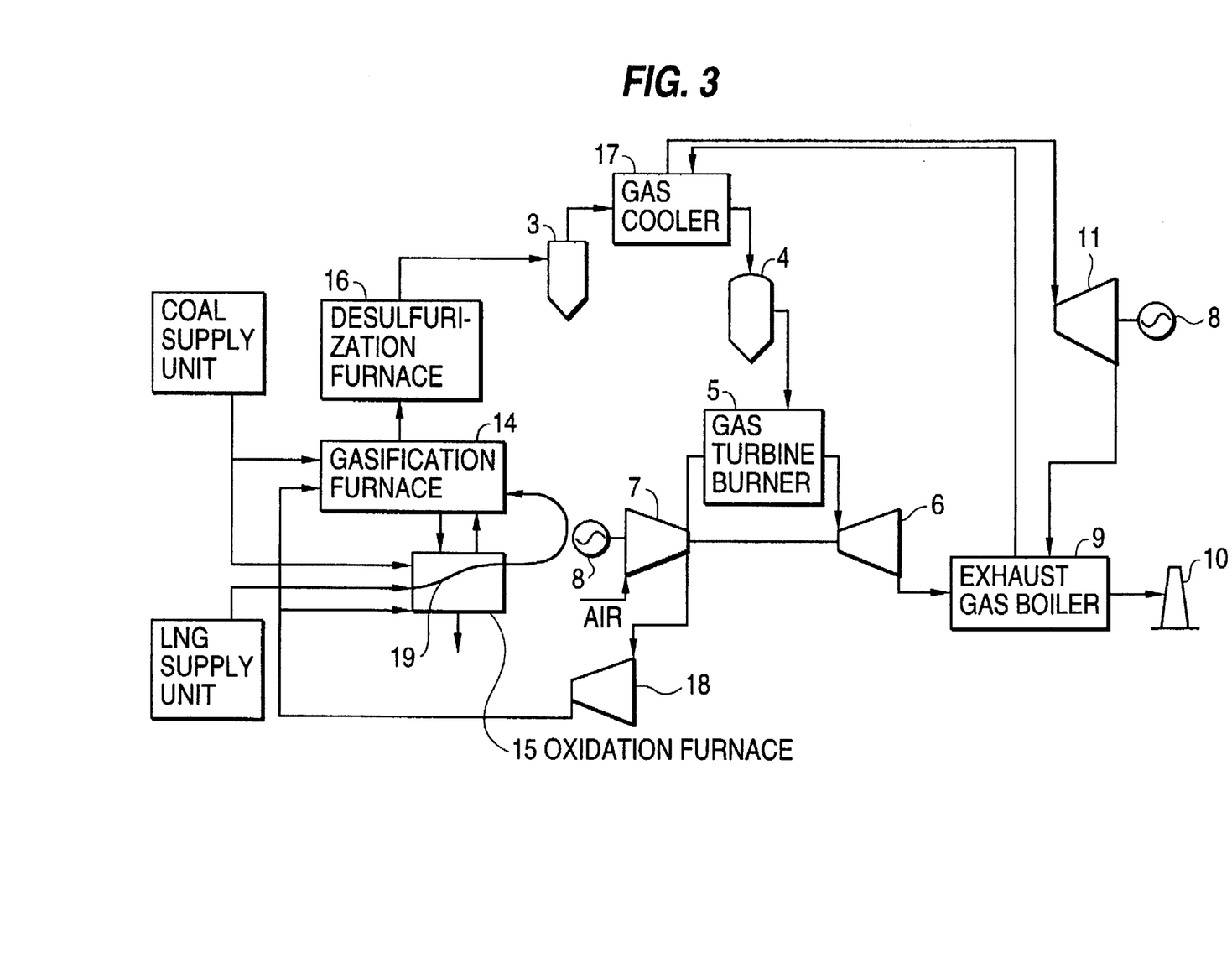
FIG. 3 is a structural diagram showing a power generating system in accordance with a third embodiment of the present invention.

FIG. 3 shows a third embodiment of the present invention.

In this embodiment, a fuel reformer is disposed within the oxidation furnace 15 in the conventional plant shown in FIG. 14.

Using heat produced from the oxidation furnace 15, which completely burns as a main fuel unburnt char, which is obtained by partially burning in the gasification furnace 14, natural gas is reformed by the fuel reformer 19 under the reformation conditions where the reformation temperature is 800° C., the reformation pressure is 30 atm and S/C is 2.5. The reformed gas contains a large quantity of steam as described above, and is thrown in the gasification furnace.

Gasified coal gas and reformed gas are mixed together in the gasification furnace 14 and then reduced under a reducing atmosphere in the desulfurization furnace 16. Subsequently, after the gas exchanges heat with the steam system in the gas cooler 17 through the cyclone 3, the gas presses through the ceramic filter 4 before being burned in the gas turbine burner 5. The gas allows the gas turbine 6 to drive the compressor 7 and to generate compressor 7 is further boosted by the air booster 18 before being introduced into the gasification furnace 14 and the oxidation furnace 15.

Downstream of the gas turbine 6 is an exhaust gas boiler 9 for collecting heat using high-temperature exhaust gas from the gas turbine. The exhaust gas exchanges heat with the steam system and is them discharged from the tunnel 10.

The steam system receives heat supplied from the gas cooler 17 and the exhaust gas boiler 9 and allows the steam turbine 11 to generate power at the power generate 8. Thus, the plant system of the high efficiency as a whole is constituted and improved 4% as a relative value.

(Fourth Embodiment)

Figure 4:
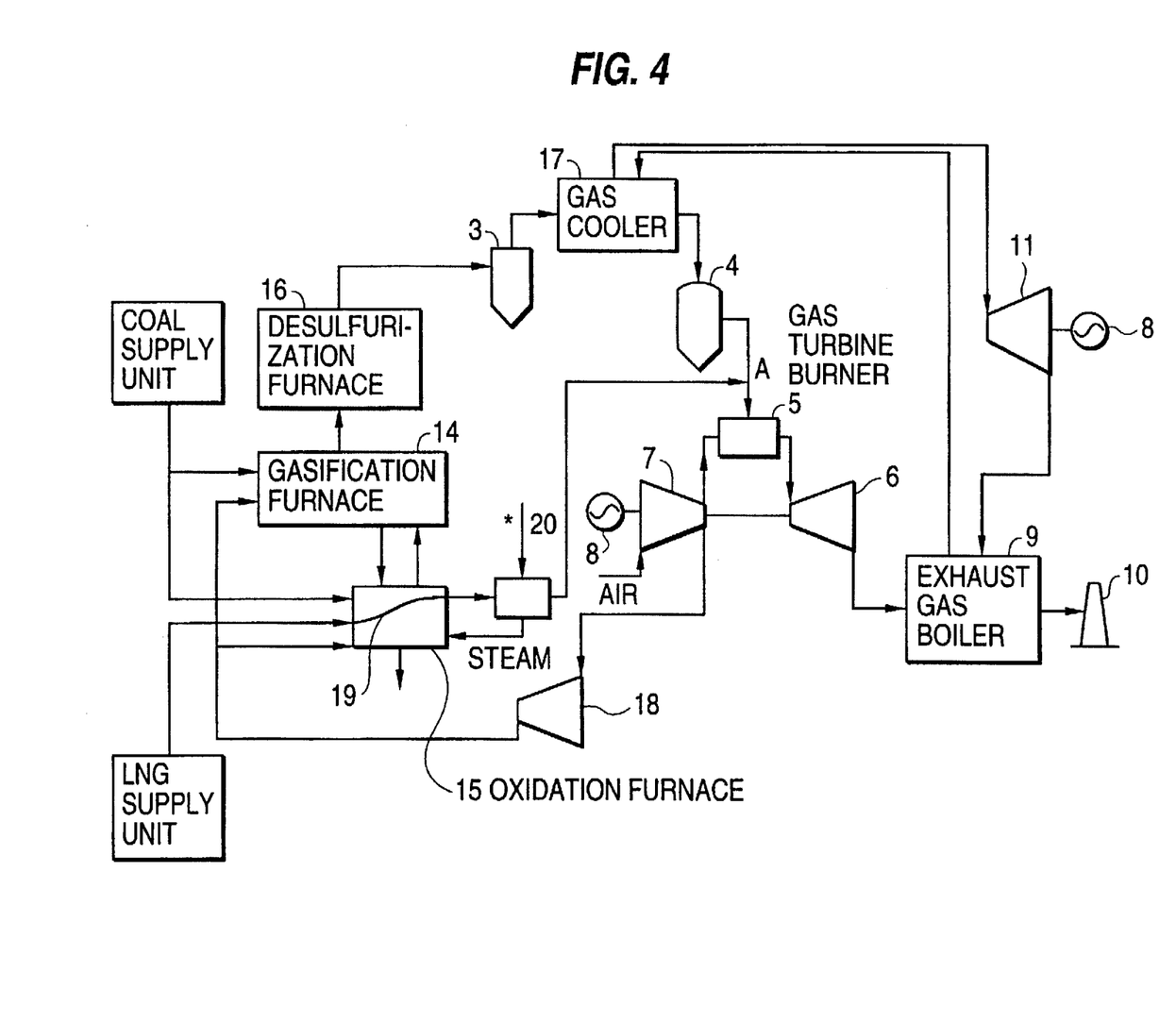
FIG. 4 is a structural diagram showing a power generating system in accordance with a fourth embodiment of the present invention.

FIG. 4 shows a fourth embodiment of the present invention.

Similar to the third embodiment, in this embodiment a fuel reformer 19 is disposed within the oxidation furnace 15. In the fourth embodiment, reformed gas, resulting from reforming natural gas under the conditions where reformation temperature is 800° C., reformation pressure is 30 atm and S/C is 2.5, is mixed with gasified coal gas at a point A immediately before the gas turbine burner 5, not the gasification furnace 14.

Because reformed gas at the outlet of a steam generator 20 is at 450° C. and is mixed with gasified coal gas immediately before the burner 5, the capacity of the gas cooler 17, the cyclone 3, and the ceramic filter 4, which constitute a dust collector, can be reduced. As a result, the mechanical equipment costs of the entire plant can be reduced to about 60% of that in the third embodiment. However, since the steam for preventing the precipitation of carbon is newly thrown in the gasification furnace 14, the efficiency of the plant is improved about 3% as a relative value, which is slightly lower than that in the third embodiment.

(Fifth Embodiment)

Figure 5:
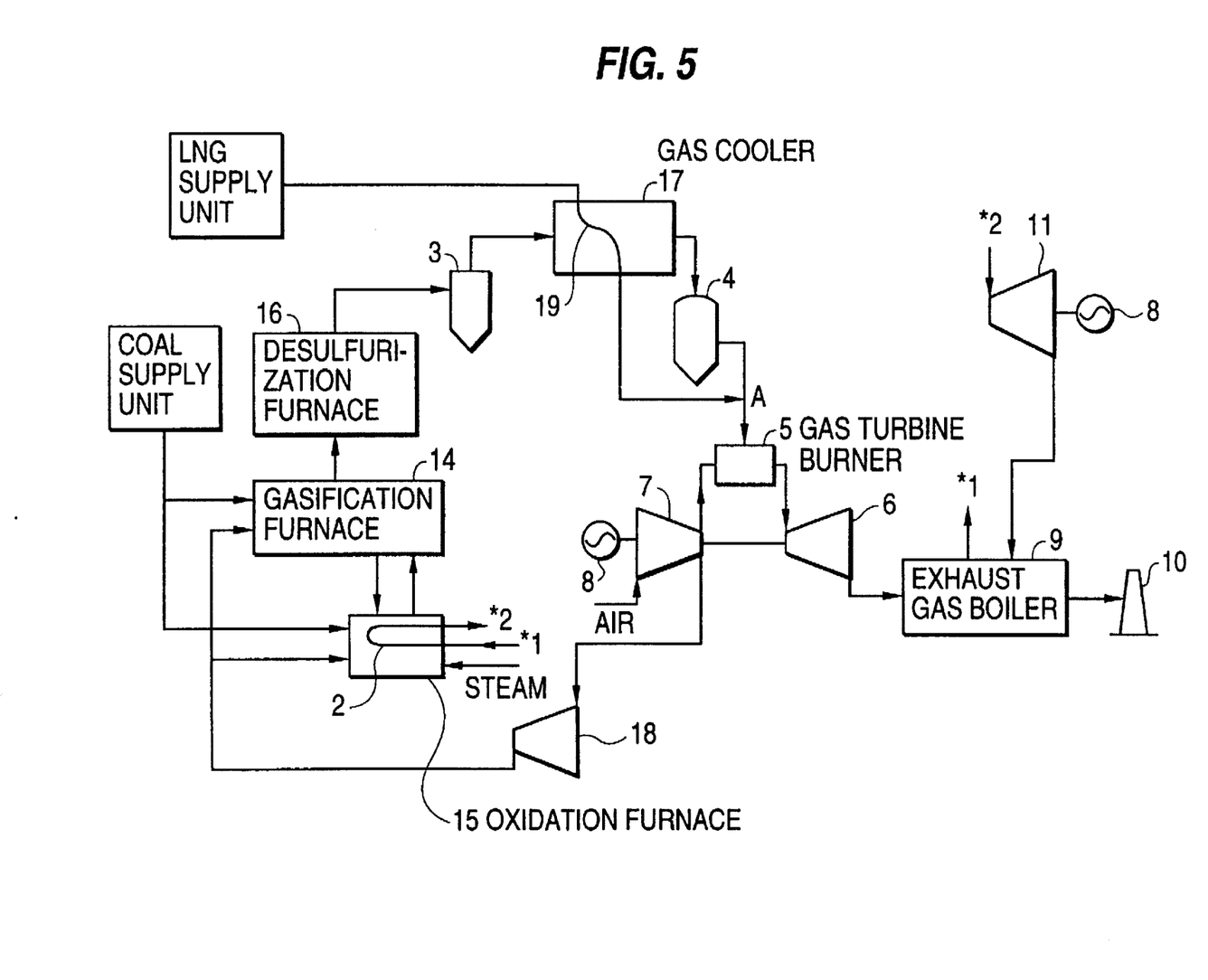
FIG. 5 is a structural diagram showing a power generating system in accordance a fifth embodiment of the present invention.

FIG. 5 shows a fifth embodiment of the present invention.

In this embodiment, a fuel reformer 19 is disposed within the gas cooler 17 in the conventional plant shown in FIG. 14. The embodiment is identical to the fourth embodiments except that the reformation of natural gas, under the conditions where reformation temperature is 800° C., reformation pressure is 30 atm and S/C is 2.5, is conducted using gasified coal gas which as passed the cyclone 3 from the outlet of the desulfurization furnace 16.

(Sixth Embodiment)

Figure 6:
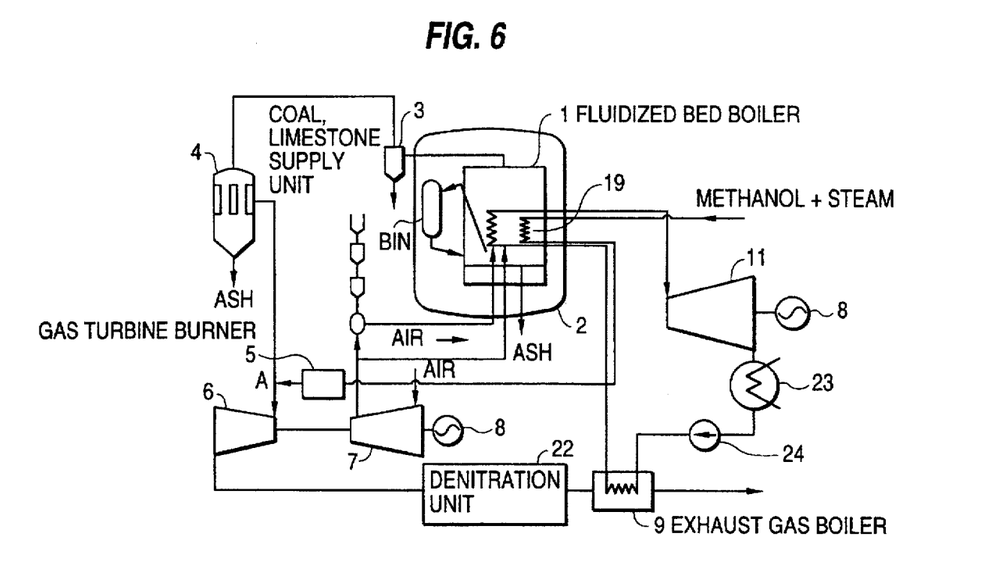
FIG. 6 is a structural diagram showing a power generating system in accordance with a sixth embodiment of the present invention.

FIG. 6 shows a sixth embodiment of the present invention.

In this embodiment, a fuel reformer is disposed within the pressure fluidized bed boiler 1 as in the first embodiment so that methanol is reformed. The reformation of the methanol is enabled at a low heating value, that is, about 21.7 kcal with respect to one mole of methanol.

In this embodiment, using the heat produced by the pressure fluidized bed boiler 1, the methanol reformer 19 is disposed within the fluidized bed for reforming the fuel of methanol.

After being burned in the gas turbine burner 5, reformed methanol gas is mixed combustion gas which has passed the dust removing unit at the point A, immediately before the gas turbine. Because the temperature of the exhaust gas from the gas turbine is 400° to 500° C., at is, a high temperature, the exhaust gas is heat-recovered by an exhaust gas boiler 9 after having passed the denitration unit 22, so that a power generator 8 coupled to the steam turbine 11 generates power.

As in the fuel reformer 19 shown in FIG. 7, the fuel reformer 19 for reforming methanol is a of a double-tube structure, in which a copper based catalyst is filled in between the inner and outer cylinders thereof. Methanol and steam are made to enter from the inner cylinder, and reheated for the purpose of restraining in the precipitation of carbon within the catalyst as much as possible. Subsequently, the tube bottom reverses the flow so that methanol is introduced to the outer cylinder, thus reforming the methanol.

According to this embodiment, the efficiency of the plant is improved about 3% as a relative value. In FIG. 6, reference numeral 23 denotes a condenser, and 24 is a water supply pump.

As was described above, in the combined power plant of the present invention, a fuel reformation process is assembled into a conventional coal burner combined cycle, with the result that the efficiency of the plant is remarkably improved. This is a very important matter from the viewpoints of the effective utilization of energy resources and environmental countermeasures, and simultaneously the economics of the power plants are remarkably improved.

What is claimed is:

1. A coal burner combined power plant, comprising:
   a gas turbine having an inlet and an exhaust gas outlet;
   a coal burning furnace for burning coal under pressure having an outlet connected to said inlet of said gas turbine for supplying gas produced in said furnace to said inlet of said turbine;
   an exhaust gas boiler connected to said exhaust gas outlet for using exhaust gas from said gas turbine to generate steam;
   a steam turbine connected with said exhaust gas boiler for using steam generated therein;
   a supply of another fuel connected to said inlet of said gas turbine; and
   a fuel reformer located within said coal burning furnace and having an inlet connected to said supply of another fuel and an outlet connected to said inlet of said gas turbine such that said another fuel passes through said fuel reformer and is reformed before said inlet of said gas turbine.

2. The power plant of claim 1, wherein said furnace comprises a fluidized bed boiler within which said fuel reformer is disposed, and wherein a gas turbine burner is connected to said outlet of said fuel reformer so as to be between said fuel reformer and said gas turbine.

3. The power plant of claim 1, wherein said furnace comprises a coal gasification furnace for partially burning coal, within which said fuel reformer is disposed, and wherein a gas turbine burner is connected to said outlet of said fuel reformer so as to be between said fuel reformer and said gas turbine.

4. The power plant of claim 1, wherein said furnace comprises a coal gasification furnace and an oxidation furnace for completely burning unburned char as a main fuel, said fuel reformer being disposed within said oxidation furnace, and said fuel reformer having said outlet thereof connected to said inlet of said gas turbine by being connected to said coal gasification furnace.

5. The power plant of claim 1, wherein said furnace comprises a coal gasification furnace and an oxidation furnace for completely burning unburned char as a main fuel, said fuel reformer being disposed within said oxidation furnace, and wherein a gas turbine burner is connected to said outlet of said fuel reformer so as to be between said fuel reformer and said gas turbine.

6. The power plant of claim 1, wherein said furnace comprises a coal gasification furnace comprising a desulfurization furnace and a gas cooler, wherein said fuel reformer is disposed within at least one of said desulfurization furnace and said gas cooler, and wherein a gas turbine burner is connected to said outlet of said fuel reformer so as to be between said fuel reformer and said gas turbine.

7. The power plant of claim 1, wherein said supply comprises a supply of natural gas.

8. The power plant of claim 1, wherein said supply comprises methanol.

* * * * *